(No Model.) 2 Sheets—Sheet 2.
E. J. CORSER.
GEARING FOR CHANGING SPEED.
No. 313,711. Patented Mar. 10, 1885.
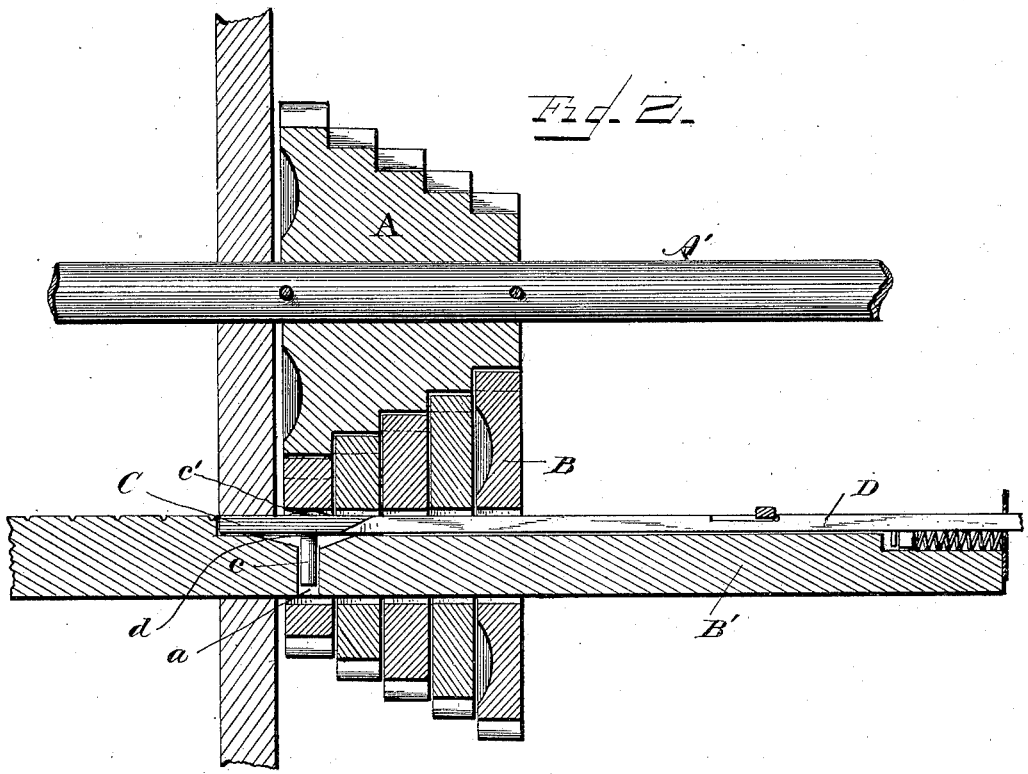
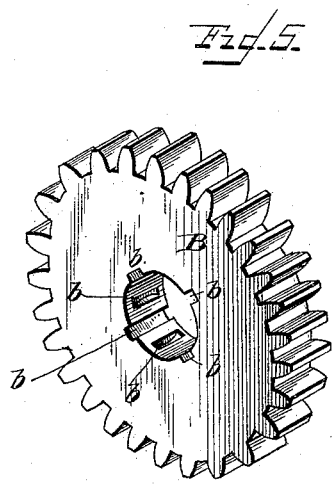
WITNESSES
F. L. Ouvrand
J. A. Huntemann
INVENTOR.
E. Jay Corser,
by A. M. Smith
Attorney

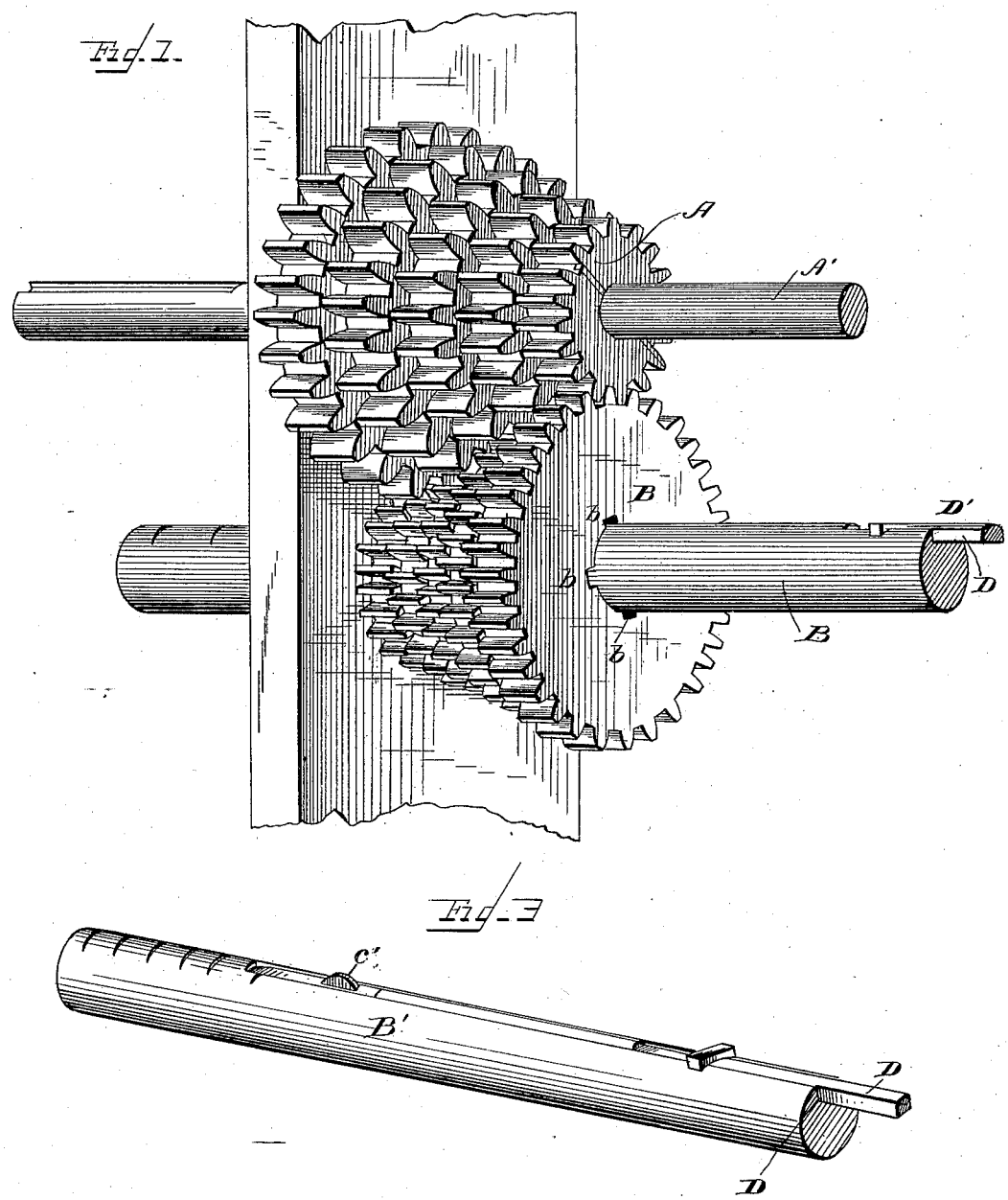

UNITED STATES PATENT OFFICE.

E. JAY CORSER, OF MACEDON, NEW YORK, ASSIGNOR TO SILAS N. GALLUP, OF SAME PLACE.

GEARING FOR CHANGING SPEED.

SPECIFICATION forming part of Letters Patent No. 313,711, dated March 10, 1885.

Application filed August 8, 1884. (No model.)

*To all whom it may concern:*

Be it known that I, E. JAY CORSER, of Macedon, county of Wayne, State of New York, have invented a new and useful Improvement in Gearing for Changing Speed, of which the following is a full, clear, and exact description, reference being had to the accompanying drawings, making part of this specification.

My invention relates to an improved device or gearing for changing speed, which is designed for use upon seeding-machines and grain-drills for varying the speed of the seed-distributers, and thus changing the amount of seed sown on a given amount of land, and will be thus described as applied to this work, while it is apparent from the description it is equally applicable and may be employed in any other class of machines where variable speed is desired—such as wood and iron lathes, &c.—and need not therefore be confined or limited to any one class of machinery.

It consists of a solid cone of gears, which imparts motion by contact with another cone of gears, each gear of which is separate and disconnected from the others, but supplied with a suitable mechanism for locking or fastening either gear of the last-named cone to the shaft upon which they are mounted and rotate, so that while thus locked or fastened to this shaft it imparts its own rotation to said shaft, leaving the other gears in said second cone to move at such speed as the gear in the solid cone first named, with which they are severally in contact, shall require, they each being left free upon their shaft to take a different motion or speed from that of any other gear forming the second cone.

In the accompanying drawings, Figure 1 is a perspective view of my gearing, showing the solid cone upon its shaft in full mesh with the several gears of the divided or separable cones, also mounted upon its shaft, and said shaft provided with a slot and sliding bar for fastening either of said gears to said shaft so as to compel its rotation with said gear. Fig. 2 is a transverse section illustrating the manner in which the gears of the divided cone are connected to the shaft. Fig. 3 is a detail perspective of the driven shaft, showing the sliding bar which actuates the locking pin or key.

Fig. 4 is a perspective view of the locking pin or key; and Fig. 5, a similar view of one of the gears which make up the divided cone of gears, showing the manner in which the walls of the central perforations are grooved or recessed to receive the spur on the locking-pin.

A represents the solid cone of gears, and B the divided cone or series of gears actuated separately by cone A. The cones A and B are mounted upon suitable shafts, A' and B', journaled in bearings in standards adapted to the purpose, and so arranged that the teeth of said gears shall be always in mesh, whether idle or keyed to their shaft.

A' represents the driving-shaft, and B' the driven shaft, or the one to which motion is imparted by the action of the gears. The different gears of cone B, unlike those of cone A, which are firmly secured together and rotate at the same speed, are each and all made separate and adapted to be actuated and rotate independently of each other. They are keyed to shaft B', one at a time only, by an adjustable key, or one which may be shifted, for the purpose of bringing the desired gear into engagement with its shaft, while all the other gears remain idle, and are what are technically called "idle-wheels." The independent gears of cone B are each provided within their central perforations with recesses $b$ $b$, of a shape corresponding to that of the spur on the locking pin or key, and adapted to receive the latter for locking the gear to the shaft.

C represents the locking-pin or T-shaped piece, the stem C of which finds its location and place in a hole, $a$, bored through said shaft from the proper point in the groove D', made in such shaft for the slide, and at right angles to the same. The slide (indicated by D) extends nearly the entire length of the slot or groove in shaft B', and has its outside surface convex upon the same arc of a circle as the circumference of the shaft in which it is operated, so that when in said shaft it fills said groove and makes the shaft complete and round as if no groove had been cut in the same. The shaft has a depression, $d$, in the groove at the point where the hole $a$ is made for the stem $c$ of the locking-pin or T-shaped piece C, which permits the head of said pin to drop into the slot of said shaft when not held in communication with any gear of the divided cone by the position of the slide, and when thus carried out of connection by its own weight this shaft may be moved endwise to bring the locking-pin opposite the chamber in the bearing of any gear of the series in the divided cone, and by moving the slide endwise and toward the pin the spur $c'$ of said pin is raised into said chamber and fastens the gear to the shaft. By pulling the slide away from the stem of the locking stud or pin, the same is allowed to sink into the shaft, and affords no resistance to the rotation of the gears in said divided cone or the shaft. These shafts, as before stated, are mounted in suitable boxes or bearings so located as to hold the gear in the solid cone in mesh with the gears forming the divided cone and always opposite each other. The solid cone is fast upon and rigidly attached to its shaft, while the gears forming the divided cone are distinct and independent of each other, as also of the shaft upon which they are mounted, except when any one of said gears is made fixed or fast upon said shaft by the operation of the locking pin or stud before described. Thus it will be seen that by the adjustment of the shaft B' any gear of cone B may be brought into engagement with said shaft, and I am enabled to secure as many changes in the speed at which the shaft B' is driven as there are gears in the cone B.

In the drawings accompanying this application five independent gears are shown making up the cone B; but more or less may be employed, according to the desire of the user or use to which the changeable speed-gear is to be applied.

Having now described my invention, I claim, viz:

1. In a device for changing speed, two cone-gears mounted on parallel shafts and in gear one with the other, one of said gears being solid, or having its gears rigidly connected and moving together, and the other made up of separate gears mounted directly upon the same shaft and adapted to move independently of each other thereon, and any one of which may be coupled directly to its shaft by an adjustable pin or key let into the same for actuating or being actuated by said shaft, substantially as and for the purpose described.

2. The combination, with the gears of the divided cone and the shaft on which said cone is mounted, of the adjustable pin or key for locking said gears to the shaft, and the slide for operating said pin or key, substantially as described.

3. The divided cone, in combination with the grooved shaft, the wedge-pointed slide adjustable in the groove of the shaft, and the pin or key operated by said slide to engage the gears of the cone with the shaft, substantially as described.

4. The combination of the divided cone, the grooved shaft, the slide working in the groove of said shaft, the pin or key for locking the gears of said cone to the shaft, and a spring for actuating the slide and pin or key, substantially as described.

In testimony whereof I have hereunto set my hand this 16th day of July, A. D. 1884.

E. JAY CORSER.

Witnesses:
 DE WITT C. BRUNDAGE,
 LEE BREESE.